United States Patent [19]

Scott

[11] Patent Number: 4,526,189
[45] Date of Patent: Jul. 2, 1985

[54] FLUID DELIVERY SYSTEM INCORPORATING ELASTOMERIC CHECK VALVE

[75] Inventor: Richard D. Scott, Northridge, Calif.

[73] Assignee: HR Textron Inc., Valencia, Calif.

[21] Appl. No.: 594,138

[22] Filed: Mar. 28, 1984

Related U.S. Application Data

[63] Continuation-in-part of Ser. No. 512,830, Jul. 11, 1983.

[51] Int. Cl.³ .............................................. F16K 13/04
[52] U.S. Cl. .................... 137/68 A; 137/71; 137/112; 137/860
[58] Field of Search .............. 137/68 A, 71, 112, 860, 137/68 R; 73/432 B; 62/514

[56] References Cited

U.S. PATENT DOCUMENTS

| | | | |
|---|---|---|---|
| 2,588,306 | 3/1952 | Taylor | 137/68 R |
| 3,416,548 | 12/1968 | Bach | 137/68 A |
| 4,181,139 | 1/1980 | Martini | 137/68 A |
| 4,214,607 | 7/1980 | Bouteille | 137/860 X |
| 4,480,653 | 11/1984 | Vandenburg | 137/112 |

Primary Examiner—Harold W. Weakley
Attorney, Agent, or Firm—Nilsson, Robbins, Dalgarn, Berliner, Carson & Wurst

[57] ABSTRACT

A valve useful for connecting a source of fluid under pressure to a using apparatus upon actuation of an explosive squib. The connecting structure includes an outer tube of soft material within which there is disposed an additional tube of material having a frangible area. The inner and outer tubes define an annular space and an inner tubular space. One of the spaces is connected to the source of fluid under pressure, while the other of the spaces is connected to the using apparatus. Particularly, the inner tubular space is connected to a source of gas under pressure, while the outer annular area is connected to the using apparatus. Upon actuation of the squib the inner frangible tube is broken at the frangible area upon a bending of the outer tube without its fracturing thereby connecting the source of fluid under pressure to the using apparatus, while at the same time isolating the products of combustion of the squib. An elastomeric check valve closes a port provided for periodic testing except when test fluid under pressure is applied.

8 Claims, 5 Drawing Figures

FLUID DELIVERY SYSTEM INCORPORATING ELASTOMERIC CHECK VALVE

This application is a continuation-in-part application of U.S. patent application Ser. No. 512,830 filed July 11, 1983 for FLUID DELIVERY SYSTEM.

BACKGROUND OF THE INVENTION AND DESCRIPTION OF THE PRIOR ART

The present invention relates generally to fluid flow valves and particularly to apparatus for controlling the flow of fluids from a source thereof contained at very high pressures to a using apparatus.

In the operation of certain types of devices, for example, such as heat seeking missiles, it becomes necessary to maintain the infrared lens of such systems at cryogenic temperatures. The operation of these systems requires the application of fluids maintained at extremely high pressures to the cryostat in response to the occurrence of a prearranged sequence of events. Until the occurrence of these events it is necessary that the fluid container be absolutely leak tight and that upon the occurrence of the sequence of events, the fluid be propelled rapidly from the container thereof to the cryostat.

It is desirable that the valving mechanism in structures of the type above generally referred to be constructed as an integral part of the overall device to preclude any opportunity for leakage of the gas under pressure subsequent to final assembly and filling of the container. It is also desirable that provisions be made for periodic testing of the cryostat and the infrared lens without utilization of the fluid under pressure held within the container.

Various prior art devices have been utilized which contain a source of pressurized fluid which, upon actuation of a squib or similar device, releases the pressure. Typically, such devices are useful in the field of fire extinguishing devices, zero leakage valves useful in aerospace fuel containers, propulsion systems for rockets and torpedos, jet engines, gas turbines and the like. Typical of such prior art devices are those disclosed in the following U.S. Pat. Nos.:

2,141,232, R. E. Wallace et al
2,557,448, A. Mathiesen
2,801,517, M. J. Zucrow et al
2,937,654, L. Bruce Wilner
3,630,214, K. A. Levering
3,719,194, D. M. Anderson et al
3,794,057, E. H. Badger
3,915,235, H. Hamilton et al
4,126,184, J. O. Hinrichs Each of the devices shown in the prior art patents above-referred to deal with a valving mechanism which interconnect fuel or other fluids to a using means and which contain frangible fittings of some type. In some instances the apparatus conducts fluid maintained under high pressure in a container through conduits to a using apparatus. However, none of the prior art patents disclose apparatus of the type disclosed and claimed herein.

SUMMARY OF THE INVENTION

First and second disposed tubes, one within the other, the walls of which define flow paths; the outer tube is constructed of bendable, soft, metallic material, while the inner tube is constructed of frangible metallic material. Opposite ends of the two flow paths are open and are connected, respectively, to a source of fluid under pressure and a using apparatus but the flow paths are normally blocked. Means is disposed intermediate the ends of the tubes for applying a mechanical force of sufficient strength to bend the outer tube and fracture the inner frangible tube to thereby interconnect the flow paths and the source of fluid under pressure to the using apparatus. An additional test flow path connected between the using apparatus flow path and a test fluid path and an elastomeric check valve disposed at the intersection of the test and using apparatus flow paths.

DETAILED DISCLOSURE

Figure 1:
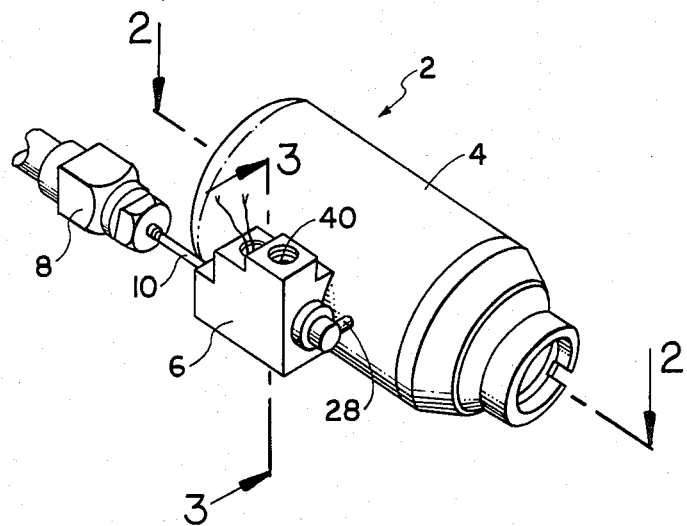
FIG. 1 is a perspective view illustrating generally apparatus constructed in accordance with the present invention.

Apparatus constructed in accordance with the present invention is shown generally at 2 in FIG. 1 and includes a package 4 within which is arranged a self-contained source of fluid under pressure and a cryostat. A body 6 is rigidly affixed to the package 4 and contains the appropriate valving and actuating apparatus. A fitting 8 is connected by a tube 10 to the body 6. The fitting 8 is connected to a source of fluid, under pressure (not shown) for filling the container within the package 4 as will be more fully explained hereinafter. Subsequent to filling, the tube 10 is pinched, sealed, severed and the fitting 8 removed. Thereafter appropriate actuating devices as more fully explained below are incorporated into the body 6 to render the unit operable. The structure as generally shown in FIG. 1 and as above generally discussed, is useful to contain a source of pressurized fluid, particularly gas such as argon which is maintained at a relatively high pressure, for example, approximately 6000 p.s.i. When the pressurized gas is released it is transmitted into the cryostat and expands in order to bring an infrared lens to the desired cryogenic operating temperature. Apparatus of the type disclosed herein is particularly useful in single use applications such as heat seeking missiles.

During the period prior to use it is desirable to periodically test the lens and associated equipment to assure it is operational without disturbing the fluid under pressure in the package 4. For this purpose there is provided a port 40 to which a source of test fluid under pressure may be connected for the desired tests.

Figure 2:
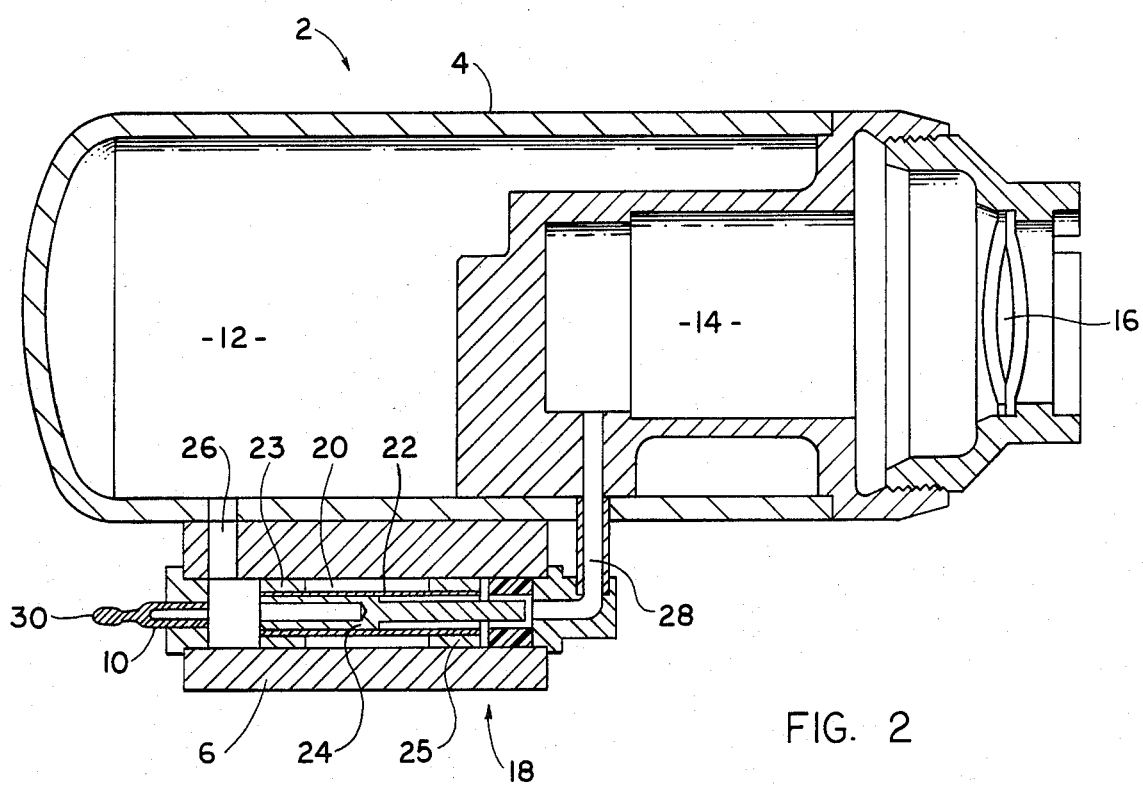
FIG. 2 is a cross sectional view of the apparatus shown in FIG. 1 taken about the lines 2—2 thereof, showing a completed device wherein a container of pressurized fluid is connected to a cryostat by way of a normally closed flow path constructed in accordance with the present invention.

As is more fully shown in FIG. 2, the package 4 includes a self-contained section 12 within which the pressurized fluid such as argon is contained. Also provided is a cryostat 14 within which is positioned the apparatus to be maintained at cryogenic temepratures such as, for example, an IR lens 16. The "valve" 18 is positioned to connect the chamber 12 with the cryostat 14 as will be more fully described below.

Generally, the body 6 defines a bore 20 within which is disposed a tube 22 and a partially hollow plug 24 positioned to provide communication between passageways 26 and 28 connected, respectively, to the chamber 12 and the cryostat 14. The filling tube 10 communicates with the passageway 26 to supply the chamber 12 with pressurized fluid after which the tube 10 is pinched off and sealed as shown at 30, such for example as by welding or the like.

Figure 3:
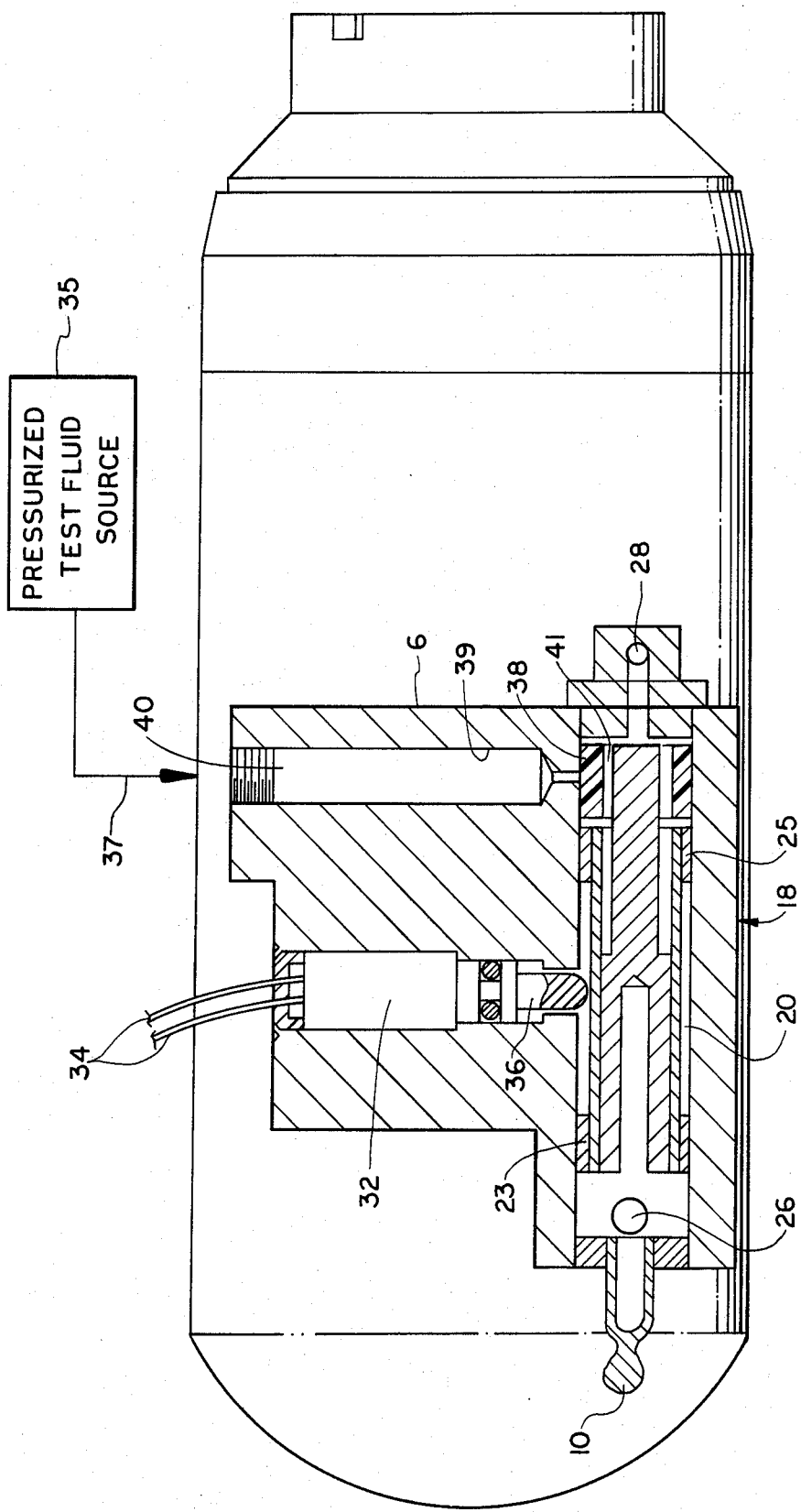
FIG. 3 is a cross sectional view taken about the lines 3—3 of FIG. 1 showing the apparatus of FIG. 2 with the actuating apparatus and testing apparatus in position.

As is more fully shown in FIG. 3, the body 6 contains therein not only the "valve" apparatus 18 interconnecting the passageways 26 and 28 but also there is positioned therein a squib 32 which, upon actuation by application of an electrical signal to the leads 34, propels a plunger 36 downwardly, as viewed in FIG. 3, into engagement with the tubes forming the valve 18 as will be more fully disclosed below. Such squibs are well known to the art as are mechanical plungers actuated thereby and thus it is not believed further description is required.

Also provided within the body 6 is a check valve 38 which permits connection of an external source 35 of test fluid under pressure to a port 40 through a conduit 37 to permit flow of the gas from the source, through the port 40 and the passageway 39, through the check valve 38, into the passageway 28 and into the cryostat 14 for testing purposes without utilization of the gas contained in the chamber 12.

Figure 4:
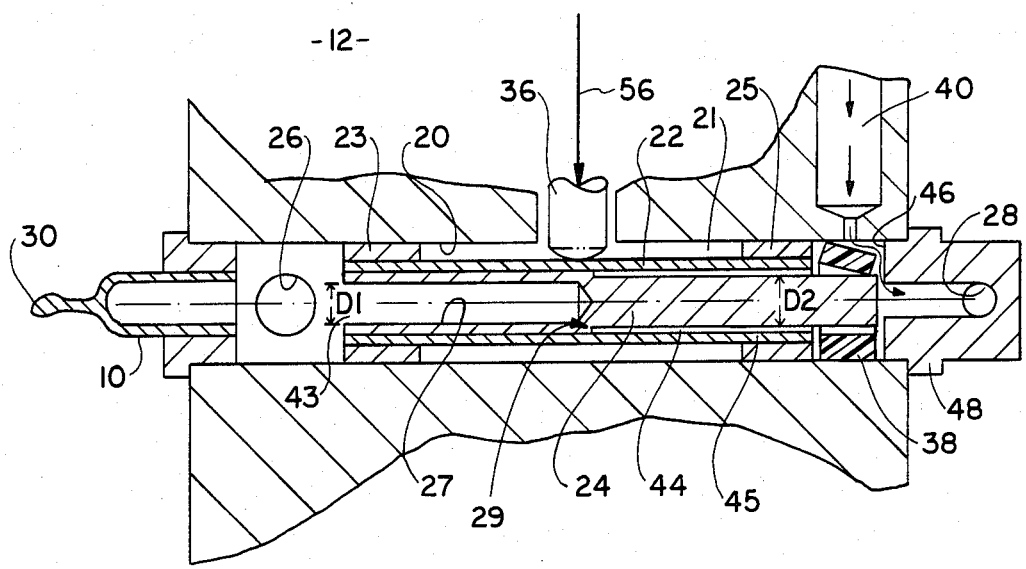
FIG. 4 is a fragmentary view showing the structure of the fracture tube valve of the present invention in greater detail shown during testing thereof.

Referring now more particularly to FIG. 4, the specific construction of a preferred embodiment of the present invention is shown. As can be more easily seen in FIG. 4, positioned within the bore 20 are the tube 22 and the plug 24. The tube 22 includes collars 23 and 25 sealingly secured to each end thereof and to the bore 20 for affixing the tube 22 within the bore 20 to provide a space 21 between the bore 20 and the outer surface of the tube 22. The plug 24 has a first diameter d1 which is substantially the same as the inner diameter of the tube 22 to provide for sealing the plug to the tube to preclude fluid flow from the chamber 12 through the interface therebetween. A blind bore 27 extends from the end of the plug 24 having the diameter d1 to a point just below the plunger 36. The opposite end of the plug 24 has a diameter d2 which is less than diameter d1 and extends from the end of the plug to approximately the bottom of the bore 27. There is thus provided a fracture area 29 for a purpose to be more fully described below. The tube 22 and the outer surface of the plug having the diameter d2 define an annular flow passage 44 surrounding the plug 24. The plug bore 27 also defines a tubular flow passage. It should be noted that the end 43 of the plug bore 27 is connected to the passageway 26 which, it will be remembered, is directly in communication with the chamber 12 containing the source of pressurized gas. It will further be noted that the end 45 of the tube 22 is in communication with the passageway 28 which leads to the cryostat 14.

The plug 24 at the fracture area 29 prevents communication through the flow path 44 with the passage 26. The outer surface of the tube 22 is welded or otherwise sealed to the collars 23 and 25. The outer surface of the collars 23 and 25 are welded or otherwise sealed to the inner surface of the bore 20.

It will now be recognized by those skilled in the art that the tube 22 and plug 24 by being appropriately sealed at opposite ends thereof and by being sealed to the body 6 provide a totally sealed unit insofar as the chamber 12 containing the pressurized gas is concerned. That is, once the chamber has been charged with gas, such as argon at 6000 p.s.i. and the filling tube 10 pinched off and sealed as above described, the chamber 12 is totally isolated and maintains a seal so that none of the pressurized fluid contained therein can leak out. Therefore the unit remains ready to function as intended at all times until the flow paths 27 and 44 are placed in communication with each other.

While the system is awaiting firing periodic testing of the cryostat region in the chamber 24 is required to assure that upon firing the system will operate properly. Obviously such testing cannot be done by using the gas in chamber 12. To do the testing the source 35 is connected to the auxilliary test port 40 and pressurized test gas is applied thereto. The pressure forces the seal 38 to deflect as shown, thus allowing the gas to flow through the passageway 39, past the seal 38 and into the outlet passageway 28 connected to the chamber 14. Upon releasing the test pressure the resilience of the seal returns it to the position shown in FIG. 3.

As can be seen from FIG. 4, the collar 25 and one end of the tube 22 form a shoulder for laterally restraining the seal 38 from movement in one direction. Movement in the opposite direction is restricted by a shoulder 46 formed on the fitting 48 which defines passageway 28. The end of the plug 24 having the diameter d2 extends internally of the seal 38 to prevent it from collapsing when test pressure is applied. The seal is constructed of an elastomeric plastic material having an outside diameter equal to that of bore 20 through which the opening 41 passes so that the seal contacts the bore 20 wall with no pressure applied. Upon application of test pressure the seal is deflected as shown in FIG. 4 to allow the test fluid to enter the cryostat. The shoulders and the plug restrain migration of the seal 38. By using an elastomeric plastic material, return to a position as shown in FIG. 3 is assured. Also upon release of gas from the chamber 12 pressure in the flow path 44 forces the seal 38 into blocking engagement with the opening 41 precluding loss of pressure. The preferred material for the seal 38 is 90 shore polyurethane plastic. It has been found that tubing of 90 shore polyurethane plastic having the correct outside diameter may be cut to the desired length and used for the seal 38. Such material easily resists erosion during repeated testing and completely seals the opening 41 without extruding therethrough.

Figure 5:
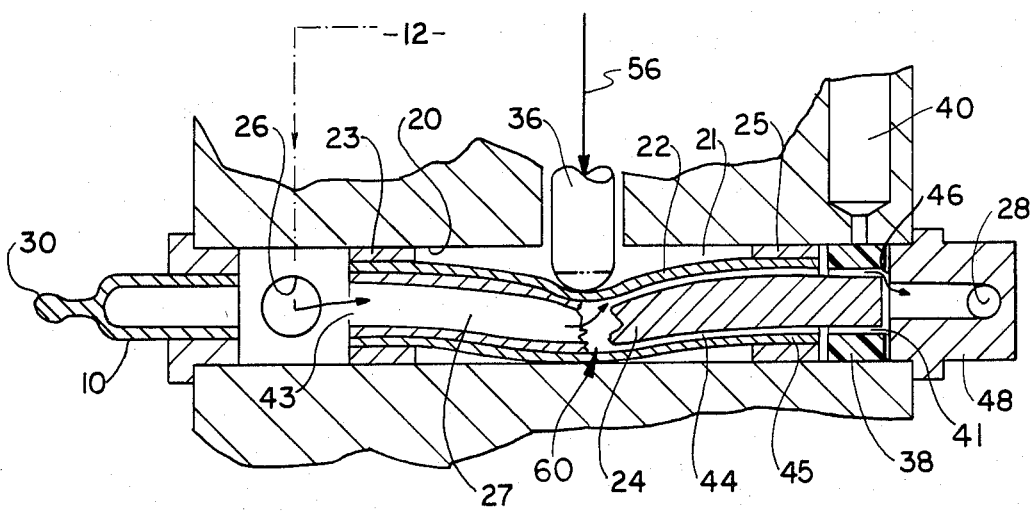
FIG. 5 is a cross sectonal view illustrating the apparatus of the invention after actuation thereof.

Upon firing of the squib 32 the plunger 36 moves downwardly in response to the force as shown by the arrow 56 applied thereto as shown in FIG. 5. Such downwardly projected force bends the outer tube 22 which is made of soft and malleable material such that the force 56 is in turn applied to the plug 24 at the fracture area 29 thereof. Upon fracturing, the two flow paths 27 and 44 are instantly placed in communication with each other and the gas, under pressure, in the chamber 12 is then permitted to flow through the flow path 27, the fracture 60, the flow path 44, the passageway 28 and into the cryostat 14. Therefore it will be seen that the tube 22 and plug 24 provide a normally closed flow path connected between the passageways 26 and 28. The structure effectively serves as a one-shot valve structure with the valve being actuated or opened upon firing of the squib. A critical feature of the structure is that the plug 24 be made of frangible, metallic material, while the outer tube is made of malleable, easily bendable, metallic material which will not fracture upon application of the mechanical force thereto but will bend sufficiently to enable application of the mechanical force to the plug with sufficient impact to allow the plug to fracture at the fracture area.

As was discussed earlier, the flow path between the chambers 12 and 14 is normally closed by welding, spin sealing or the like of the tube and within a bore 20. Thus a completely sealed chamber 12 containing the pressurized gas is provided and which is maintained ready for use until the squib 32 is fired in accordance with a pre-programmed series of events. Also as previously described, a test port 40 having a check valve 38 constructed of an elastomeric plastic material therein is provided so that the using apparatus may, from time to time, be tested by connecting an external source of gas under pressure to the testing port 40 for testing the using apparatus without disturbing the pressurized gas contained in the chamber 12.

What is claimed is:

1. In a fluid delivery system having a chamber for receiving fluid under pressure, a passageway for connecting said chamber to a using apparatus, means defining a first and a second flow path disposed in said passageway and blocking communication between said chamber and said using apparatus and having a fracture area;
    means for applying force to said fracture area sufficient to fracture said fracture area and to establish communication between said flow paths, and a test port connected to said passageway downstream of said blocking area, the improvement comprising:
    an elastomeric member disposed in said passageway and allowing flow of test gas under pressure in a first direction through said test port and into said using apparatus while blocking flow of gas under pressure in the opposite direction from said passageway and through said test port.

2. The improvement as defined in claim 1 wherein said elastomeric member is a tubular section of plastic material having an outer diameter substantially equal to the diameter of said passageway.

3. The improvement as defined in claim 2 wherein said tubular section is of 90 share polyurethane plastic material.

4. The improvement as defined in claim 3 which further includes means restraining movement of said tubular section longitudinally of said passageway.

5. The improvement as defined in claim 4 wherein said tubular section permits flow of said test gas by flexing inwardly responsive to application of said test gas under pressure to said test port and returns to contact with said passageway upon removal of said test pressure from said test port.

6. The improvement as defined in claim 5 which further includes retaining means disposed within said tubular section to limit the flexure of said tubular section.

7. The improvement as defined in claim 6 wherein said fracture area is defined by a plug member defining a blind bore extending from one end and a reduced diameter section extending from the opposite end, said bore and said reduced diameter section being co-terminus and defining said fracture area.

8. The improvement as defined in claim 7 wherein said retaining means includes said reduced diameter section of said plug member.

* * * * *